US007559467B2

(12) United States Patent
Scheb

(10) Patent No.: US 7,559,467 B2
(45) Date of Patent: Jul. 14, 2009

(54) ITEM CHECKOUT APPARATUS INCLUDING INTEGRATED COMPLIMENTARY ANTENNAS

(75) Inventor: Jeffrey E. Scheb, Roswell, GA (US)

(73) Assignee: NCR Corporation, Dayton, OH (US)

( * ) Notice: Subject to any disclaimer, the term of this patent is extended or adjusted under 35 U.S.C. 154(b) by 571 days.

(21) Appl. No.: 11/270,132

(22) Filed: Nov. 9, 2005

(65) Prior Publication Data

US 2007/0102513 A1 May 10, 2007

(51) Int. Cl.
*G06K 15/00* (2006.01)

(52) U.S. Cl. ....................... 235/383; 235/487; 235/494; 235/462.13

(58) Field of Classification Search ................. 235/487, 235/494, 462.13, 462.35, 383
See application file for complete search history.

(56) References Cited

U.S. PATENT DOCUMENTS 5,382,784 A 1/1995 Eberhardt
6,595,421 B2 * 7/2003 Detwiler ................ 235/462.14
6,942,145 B1 9/2005 Collins, Jr. et al.
2005/0092834 A1 * 5/2005 Latimer et al. .............. 235/383
2005/0242959 A1 * 11/2005 Watanabe ................ 340/572.7

FOREIGN PATENT DOCUMENTS

WO WO 98/53435 11/1998
WO WO 03/065323 A2 8/2003
WO WO 2006/110189 10/2006

* cited by examiner

*Primary Examiner*—Karl D. Frech
(74) *Attorney, Agent, or Firm*—Paul W. Martin; Harden E. Stevens, III

(57) ABSTRACT

An item checkout apparatus with integrated complimentary antennas which concentrates magnetic fields from both antennas in a volume. The item checkout apparatus includes a sensor for sensing a label on an item, a first antenna oriented in a first plane, and a second antenna oriented in a second plane substantially orthogonal to the first plane, wherein the first and second antennas concentrate first and second magnetic fields in a volume between the first and second antennas, and wherein the sensor is coupled to at least one of the first and second antennas and senses the label as the item passes through the volume.

12 Claims, 2 Drawing Sheets

ITEM CHECKOUT APPARATUS INCLUDING INTEGRATED COMPLIMENTARY ANTENNAS

BACKGROUND

Checkout systems typically include barcode readers. Today, nearly all products are labeled with barcodes, either by the manufacturers or the retailers of such products. Barcode readers come in various types for various purposes. The most common scanners are optical barcode readers which include lasers and mirrors for generating a scan pattern.

Other systems have been considered for incorporation into optical barcode readers. For example, radio frequency identification (RFID) readers and electronic article surveillance (EAS) systems have been considered for incorporation into optical barcode readers.

Integrating such systems into an optical barcode reader presents a number of challenges. In the case of RFID systems, readability is affected by RFID label orientation. In a retail checkout environment, the RFID label orientation may be uncontrolled. A number of dead zones may result near the scanner.

It would be desirable to provide an item checkout apparatus with integrated complimentary antennas.

SUMMARY

In accordance with the present invention, an item checkout apparatus with integrated complimentary antennas is provided.

The item checkout apparatus includes a sensor for sensing a label on an item, a first antenna oriented in a first plane, and a second antenna oriented in a second plane substantially orthogonal to the first plane, wherein the first and second antennas concentrate first and second magnetic fields in a volume between the first and second antennas, and wherein the sensor is coupled to at least one of the first and second antennas and senses the label as the item passes through the volume.

DETAILED DESCRIPTION

Figure 1:
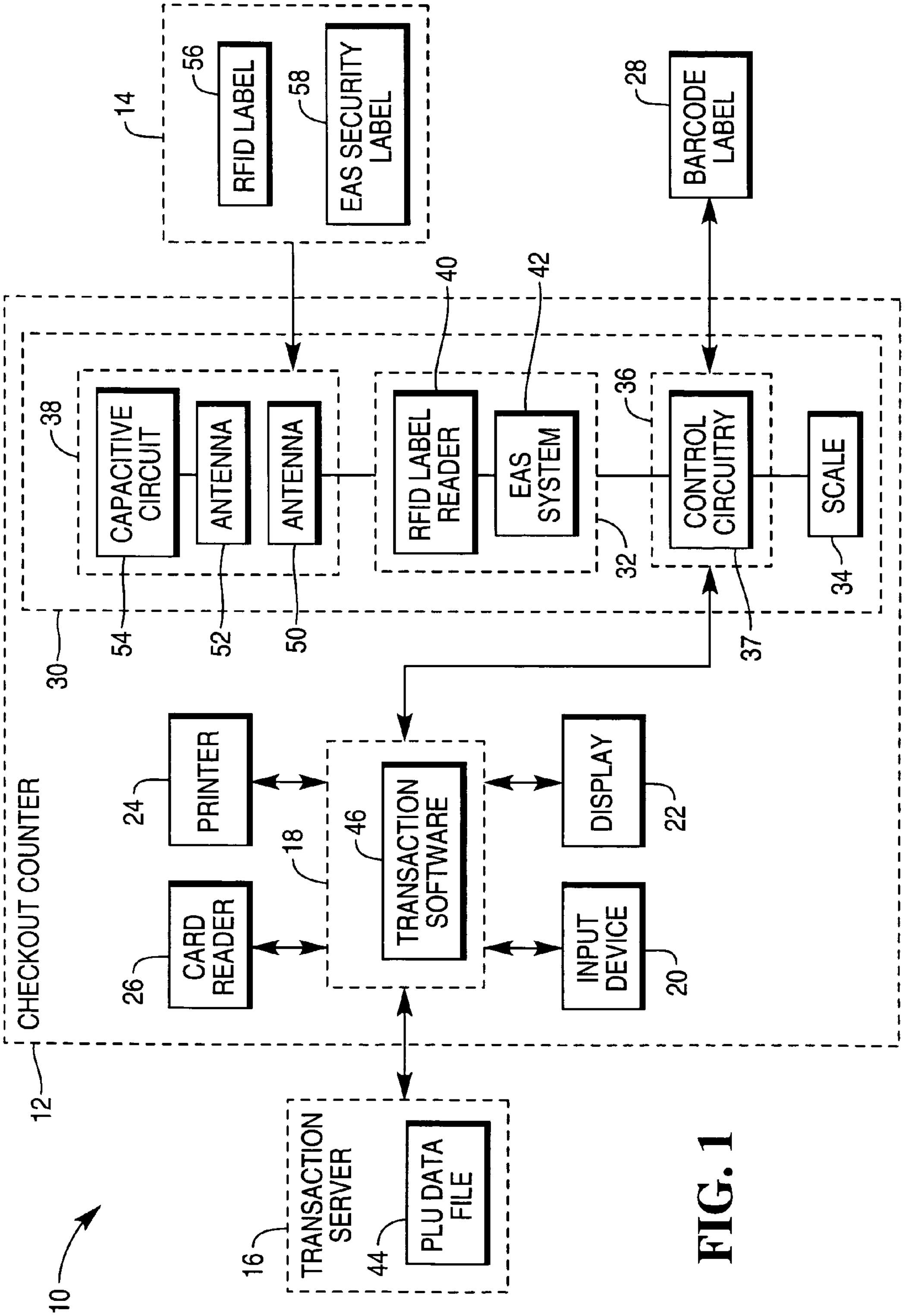
FIG. 1 is a block diagram of a transaction system with RFID capability.

Referring to FIG. 1, transaction system 10 primarily includes checkout counter 12 and transaction server 16.

Checkout counter 12 includes terminal 18, input device 20, display 22, printer 24, card reader 26, and item checkout apparatus 30.

Terminal 18 controls operation of checkout counter 12 and executes transaction software 46.

Input device 20 records customer selections. Input device 20 may be a touch screen or keyboard.

Display 22 displays program instructions to assist the customer through a transaction. Display 22 may be a liquid crystal display and may be combined with input device 20 as a touch screen.

Printer 24 prints transaction information on receipt paper.

Card reader 26 reads information from customer payment and identification cards. Card reader 26 may include a magnetic stripe reader or smart card reader or combination of both.

Item checkout apparatus 30 includes integrated system 32, barcode reader 34, and scale 36.

Integrated system 32 may include a radio frequency identification (RFID) label reader, electronic article surveillance (EAS) system, or other system that requires a coil or antenna to operate, or any combination thereof.

Label 14 may include RFID label 56 or EAS security label 58. RFID labels 56 may vary in size, depending upon product size, and may be visible or hidden when attached to a product. RFID labels 56 may be removably or permanently attached to an item.

Example EAS labels 58 include magnetic labels and electronic fuses.

As an RFID label reader 40, integrated system 32 reads identification information stored in RFID labels 56.

As an EAS system 42, integrated system 32 senses and deactivates security labels 58.

Integrated system 32 uses antennas 38 to wirelessly transmit and receive. Antennas 38 include complementary antennas 50 and 52.

Antenna 50 is coupled to integrated system 32 via a transmission line, while antenna 52 is passive (no feed line). Both antennas 50 and 52 resonate at the same frequency. An appropriate valued capacitive circuit 54 is added in series with antenna 52 in order to set the resonant frequency. Antenna 50 sends a signal to integrated system 32.

In an example RFID configuration, antennas 50 and 52 are resonant at a frequency of about 13.56 MHz. Antenna 52 may include a conductive loop antenna having an inductance of 0.5-1.0 μH.

In an example EAS configuration, antennas 50 and 52 are resonant at a frequency of about 58 kHz for sensing and 440 Hz (pulsed) for deactivation.

In more detail, antennas 50 and 52 may include loop antennas located in different planes. The loop antennas may have single or multiple windings. Antenna 52 acts as a complementary antenna reflector. When a time-varying magnetic flux from antenna 50 crosses antenna 52, it induces an electrical current inside antenna 52. This current in turn produces a magnetic field orthogonal to the plane of antenna 52. Magnetic fields produced by both antennas 50 and 52 combine to form one magnetic field, extending from antenna 50 to antenna 52.

Barcode reader 34 reads barcode label 28.

Scale 36 provides weight information for produce items and other random weight or bulk items.

In one embodiment, barcode reader 34 includes control circuitry 37 for controlling integrated system 32. For example, control circuitry 37 controls reading of RFID labels and sensing and deactivation of EAS security labels. Control circuitry manages communication of RFID label information, barcode label information, and weight information between barcode reader 34 and terminal 18 through a single serial connection.

Transaction software 46 records items for purchase and processes payment for the items. Transaction software 46 receives RFID label information, barcode information, and weight information from item checkout apparatus 30. Transaction software 46 may compare item identification information derived from both RFID label reader 40 and barcode reader 34 when both send it.

Transaction server 16 receives item identification information from terminal 18 and returns price information from price look-up data file 44.

Figure 2:
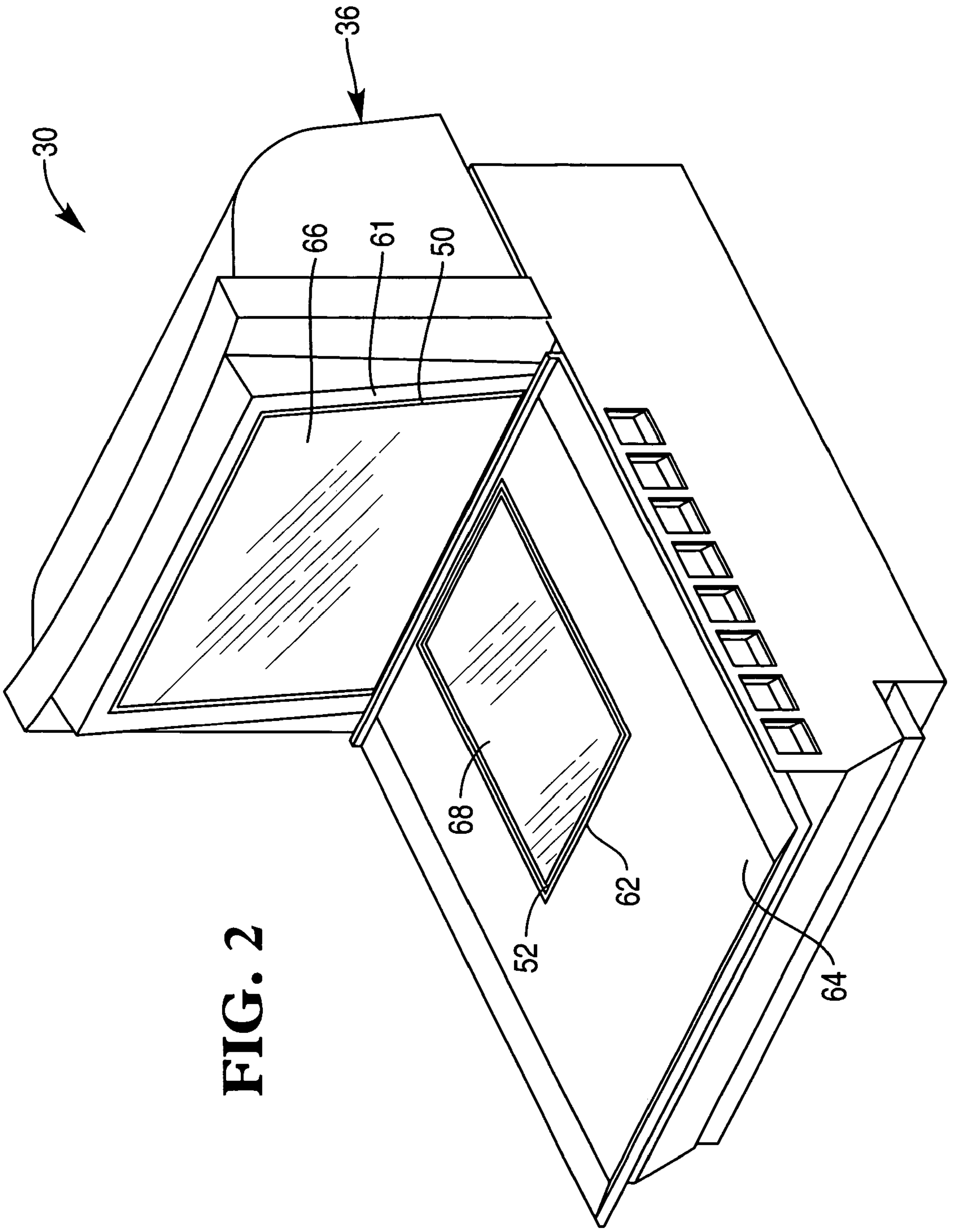
FIG. 2 is a block diagram of a barcode reader of the present invention.

Turning now to FIG. 2, an example item checkout apparatus 30 is illustrated in detail.

Barcode reader 36 includes a dual-aperture or bi-optic optical scanner having a vertical aperture 61 and a horizontal aperture 62. Such a scanner may further include a laser, motor-driven mirrored spinner, pattern mirrors, collecting mirror, photodetector, an integrated load cell, and control circuitry. Barcode reader emits one or more laser beams through vertical and horizontal apertures 61 and 62 and receives light reflected from a scanned item.

Scale weigh plate 64 is positioned over horizontal aperture 62 and includes horizontal aperture 62. Scale weigh plate 64 is mounted above a load cell. Aperture 61 contains window 66 and aperture 62 contains window 68.

In one embodiment, antennas 50 and 52 may be constructed of copper tape or a similar thin conductive material, which is then attached around windows 66 and 68 with an adhesive in the shape of a rectangle.

When incorporated barcode reader 36, complementary antennas 38 concentrate their magnetic fields in the scan volume between windows 66 and 68, which is the volume through which an item will be passed during a retail checkout process, to read RFID label 50 or sense and deactivate EAS security label 52.

Although particular reference has been made to certain embodiments, variations and modifications are also envisioned within the spirit and scope of the following claims.

What is claimed is:

1. An item checkout apparatus comprising:

a sensor for sensing a label on an item;

a first antenna oriented in a first plane; and a second antenna oriented in a second plane substantially orthogonal to the first plane where the second antenna is passive and acts as a complementary antenna reflector resonating at the same frequency as the first antenna;

wherein the first and second antennas respectively concentrate a first and a reflected second magnetic fields in a volume between the first and second antennas, and wherein the sensor is coupled to at least one of the first and second antennas and using the coupling senses the label as the item passes through the volume.

2. The apparatus of claim 1, wherein the sensor comprises a radio frequency identification label reader and wherein the label includes a radio frequency identification label.

3. The apparatus of claim 1, wherein the sensor comprises an electronic article surveillance system and wherein the label includes a security label.

4. An item checkout method comprising:

scanning a barcode on the item by a barcode reader having a substantially vertical aperture and a substantially horizontal aperture as the item passes through a volume between the substantially horizontal and vertical apertures;

concentrating a first and a reflected second magnetic field in the volume by a first antenna around the substantially vertical aperture and a second antenna around the substantially horizontal aperture where one of the first and second antennas is a passive antenna and acts as a complementary antenna reflector resonating at the same frequency as the other antenna; and sensing a label on the item by a sensor coupled to and using at least one of the first and second antennas to sense the label.

5. An item checkout apparatus comprising:

a barcode reader including a substantially horizontal surface including a substantially horizontal aperture for reading a first label on an item including a bar code label from a first direction, and a substantially vertical surface including a substantially vertical aperture for reading the first label from a second direction;

a sensor in the barcode reader for sensing a second label on the item;

a first antenna and surrounding the substantially horizontal aperture; and a second antenna and surrounding the substantially vertical aperture;

wherein the first and second antennas respectively concentrate first and reflected second magnetic fields in a volume between the first and second antennas, wherein the sensor is coupled to one of the first and second antennas and one of the first and second antennas is a passive antenna and acts as a complementary antenna reflector resonating at the same frequency as the other antenna, and wherein the sensor using the coupling senses the label as the item passes through the volume.

6. The apparatus of claim 5, wherein the sensor comprises a radio frequency identification label reader and wherein the label includes a radio frequency identification label.

7. The apparatus of claim 5, wherein the sensor comprises an electronic article surveillance system and wherein the label includes a security label.

8. The apparatus of claim 5, wherein the first and second antennas are made of copper and are attached to the substantially horizontal and vertical surfaces.

9. The apparatus of claim 5, wherein the substantially horizontal and vertical apertures are substantially rectangular and the first and second antennas are substantially rectangular.

10. A checkout method comprising:

concentrating first and reflected second magnetic fields in a volume by first and second substantially orthogonal antennas where the second antenna is passive and acts as a complementary antenna reflector resonating at the same frequency as the first antenna to generate the reflected second magnetic field; and sensing a label on an item passing through the volume by a sensor coupled to and using at least one of the first and second substantially orthogonal antennas to sense the label.

11. The method of claim 10, wherein the sensor comprises a radio frequency identification label reader and wherein the label includes a radio frequency identification label.

12. The apparatus of claim 10, wherein the sensor comprises an electronic article surveillance system and wherein the label includes a security label.

* * * * *